(12) United States Patent
Heredia et al.

(10) Patent No.: US 7,995,899 B2
(45) Date of Patent: Aug. 9, 2011

(54) APPARATUS, METHOD AND DATABASE FOR CONTROL OF AUDIO/VIDEO EQUIPMENT

(75) Inventors: Rafael Heredia, Easley, SC (US); Frank U. Greer, Greenville, SC (US); Randolph G. Young, Simpsonville, SC (US); Sean S. Priddy, Simpsonville, SC (US); Michael P. Dean, Easley, SC (US)

(73) Assignee: Digital Networks North America, Inc., Cupertino, CA (US)

( * ) Notice: Subject to any disclaimer, the term of this patent is extended or adjusted under 35 U.S.C. 154(b) by 1431 days.

(21) Appl. No.: 11/455,535

(22) Filed: Jun. 19, 2006

(65) Prior Publication Data

US 2006/0239650 A1    Oct. 26, 2006

Related U.S. Application Data

(63) Continuation of application No. 09/453,023, filed on Dec. 2, 1999, now Pat. No. 7,065,287.

(51) Int. Cl.
*H04N 5/76* (2006.01)
*H04N 9/80* (2006.01)

(52) U.S. Cl. .................... 386/238; 386/262
(58) Field of Classification Search .............. 386/291, 386/296, 313, 326, 248, 238, 262
See application file for complete search history.

(56) References Cited

U.S. PATENT DOCUMENTS

| | | | |
|---|---|---|---|
| 4,703,359 A | 10/1987 | Rumbolt et al. | |
| 4,922,476 A * | 5/1990 | Kiyoura et al. | 369/47.1 |
| 5,307,173 A | 4/1994 | Yuen et al. | |
| 5,335,079 A | 8/1994 | Yuen et al. | |
| 5,346,326 A | 9/1994 | Bienvenu | |
| 5,353,121 A | 10/1994 | Young et al. | |
| 5,412,766 A | 5/1995 | Pietras et al. | |
| 5,479,268 A | 12/1995 | Young et al. | |
| 5,488,409 A | 1/1996 | Yuen et al. | |
| 5,515,173 A | 5/1996 | Mankovitz et al. | |
| 5,517,612 A | 5/1996 | Dwin et al. | |
| 5,523,796 A | 6/1996 | Marshall et al. | |
| 5,532,732 A | 7/1996 | Yuen et al. | |
| 5,532,754 A | 7/1996 | Young et al. | |

(Continued)

FOREIGN PATENT DOCUMENTS

EP    0 817 181    1/1998

(Continued)

OTHER PUBLICATIONS

"Yamada @ PET RP-U100 Receiver", printed Nov. 24, 1999 from http://www.yamaha.com/yec/products/newprods/PChometheater/pchtinfo.htm/.

(Continued)

*Primary Examiner* — Robert Chevalier
(74) *Attorney, Agent, or Firm* — McDonnell Boehnen Hulbert & Berghoff LLP

(57) ABSTRACT

Control of audio/video equipment is provided by an apparatus constructed like a computer, with audio and video subsystems. The audio subsystem includes a programmable analog mixer and several analog and digital multiplexers to route and mix multiple inputs to multiple outputs. Databases are stored in computer mass storage to record preferences for playback of digital versatile discs, compact discs and audio files stored in the mass storage device, such as MP3 files. The playback preferences may include video output format, language, surround sound mode, etc. for DVDs and surround sound effects for CDs and audio files.

36 Claims, 17 Drawing Sheets

U.S. PATENT DOCUMENTS

| | | | |
|---|---|---|---|
| 5,539,391 A | 7/1996 | Yuen | |
| 5,541,738 A | 7/1996 | Mankovitz | |
| 5,550,576 A | 8/1996 | Klosterman | |
| 5,552,837 A | 9/1996 | Mankovitz | |
| 5,553,123 A | 9/1996 | Chan et al. | |
| 5,555,098 A | 9/1996 | Parulski | |
| 5,559,550 A | 9/1996 | Mankovitz | |
| 5,598,523 A | 1/1997 | Fujita | |
| 5,619,274 A | 4/1997 | Roop et al. | |
| 5,619,383 A | 4/1997 | Ngai | |
| 5,673,089 A | 9/1997 | Yuen et al. | |
| 5,684,525 A | 11/1997 | Klosterman | |
| 5,694,334 A | 12/1997 | Donahue et al. | |
| 5,701,383 A | 12/1997 | Russo et al. | |
| 5,710,601 A | 1/1998 | Marshall et al. | |
| 5,724,106 A | 3/1998 | Autry et al. | |
| 5,727,060 A | 3/1998 | Young | |
| 5,751,672 A | 5/1998 | Yankowski | |
| 5,768,539 A | 6/1998 | Metz et al. | |
| 5,774,063 A | 6/1998 | Berry et al. | |
| 5,790,198 A | 8/1998 | Roop et al. | |
| 5,801,787 A | 9/1998 | Schein et al. | |
| 5,808,608 A | 9/1998 | Young et al. | |
| 5,809,204 A | 9/1998 | Young et al. | |
| 5,828,945 A | 10/1998 | Klosterman | |
| 5,852,478 A | 12/1998 | Kwoh | |
| 5,854,621 A | 12/1998 | Junod et al. | |
| 5,870,150 A | 2/1999 | Yuen | |
| 5,886,746 A | 3/1999 | Yuen et al. | |
| 5,915,026 A | 6/1999 | Mankovitz | |
| 5,923,362 A | 7/1999 | Klosterman | |
| 5,940,073 A | 8/1999 | Klosterman et al. | |
| 5,949,954 A | 9/1999 | Young et al. | |
| 5,959,688 A | 9/1999 | Schein et al. | |
| 5,969,748 A | 10/1999 | Casement et al. | |
| 5,970,206 A | 10/1999 | Yuen et al. | |
| 5,974,222 A | 10/1999 | Yuen et al. | |
| 6,112,007 A | 8/2000 | Kram | |
| 6,233,389 B1 | 5/2001 | Barton et al. | |
| 2004/0049791 A1 | 3/2004 | Shah et al. | |

FOREIGN PATENT DOCUMENTS

| | | |
|---|---|---|
| EP | 0 910 088 | 4/1999 |
| WO | 98/09290 | 3/1998 |

OTHER PUBLICATIONS

"SRS Labs Files Patents for Internet Audio Broadcast Technologies for the Next Generation of Enhanced Stereo and Surround Sound", PR Newswire, Dec. 15, 1999.

HTPC Home Theater PC advertisement in *Computer Shopper*, Dec. 1999.

Logitech Mouse and Trackball User's Guide.

Xantech Models 282-00 and 284-00 Mini Emitters Installation Instructions.

ADCOM GFB-800 Operating Instructions.

ADCOM GTP-600 Surround Sound Tuner/Preamplifier Owner's Manual.

ADCOM GCD-700 CD Player Owner's Manual.

JDS InfraRed Xpander User manual.

DVX 8000 manual, Philips Electronics North America Corporation, 1997.

* cited by examiner

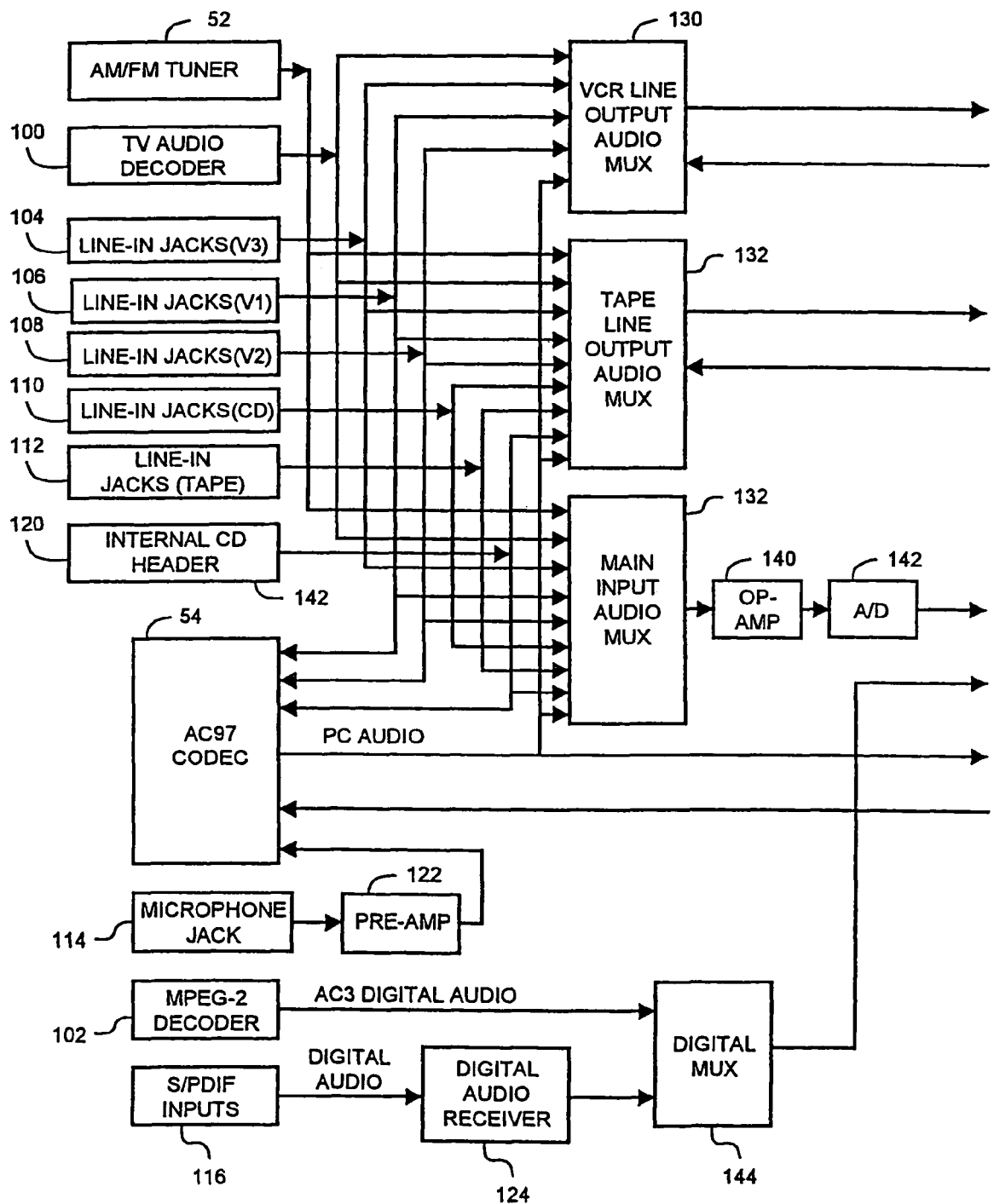

FIG. 6A

TV Guide

APRIL 9, 1999 - 7:24 PM

CARREY PLAYS TRUMAN BURBANK, A MAN WHO WAS BROUGHT INTO THIS WORLD TO BE A TV SHOW. HIS ENTIRE WORLD IS A SOUNDSTAGE, HIS FAMILY, FRIENDS AND THE PEOPLE IN TOWN ARE ALL ACTORS AND HE DOES NOT ...
PRESS * TO SEARCH

CHANNEL 8

| CHANNEL | | 7:00 PM | 7:30 PM |
|---|---|---|---|
| 4 | ⓒ | AS THE WORLD TURNS | |
| 8 | HBO | THE TRUMAN SHOW | |
| 12 | Fox | WHEN COWS ATTACK | |
| 60 | NBC | 20/20 | ○ THE HISTORY |
| 65 | ESPN | THE COCA COLA 500 | ○ |
| 89 | | THE X-FILES | DATELINE |
| 128 | | THE PLAYBOY CHANNEL | |
| 129 | | THE DIRTY DOZEN | |

FIG. 6C

DVD Guide

APRIL 9, 1999 - 7:24 PM

DRAMA 128 MINUTES R
STUDIO: TRISTAR
DIRECTOR: ???
AUDIO: DOLBY DIGITAL
LANGUAGES: ENG, FRE, SPA
INTERACTIVE: YES

GOOD WILL HUNTING

PRESS * TO SEARCH

| | GENRE/RATING | TITLE | LEAD ACTOR |
|---|---|---|---|
| 1 | MSY PG | KISS THE GIRLS | MORGAN FREEMAN |
| 2 | DRA PG | GOOD WILL... | MAT DAMEON |
| 3 | COM PG | THE NUTTY... | EDDIE MURPHY |
| 4 | HOR PG | HALLOWEEN H20 | JAMIE LEE... |
| 5 | COM PG | WHEN HARRY... | MEG RYAN |
| 6 | ACT PG | RAIDERS OF THE... | HARRISON FORD |
| 7 | ACT PG17 | AIR FORCE ONE | HARRISON FORD |
| 8 | MUS PG13 | THE WALL | PINK FLOYD |

Activelink  MILLENNIUM

FIG. 6F

Radio Guide

APRIL 9, 1999 7:24 PM

| ALL STATIONS | LOCAL ROCK | THE BEST NET | COUNTRY | THE KIDS ▷ |
|---|---|---|---|---|
| | | | | PRESS * TO SEARCH |

| # | BAND | STATION | GENRE | LOCATION |
|---|---|---|---|---|
| 1 | FM | WROQ ROCK 101 | CLASSIC ROCK | GREENVILLE, SC |
| 2 | AM | WABC 625 | TALK RADIO | ANDERSON, SC |
| 3 | NET | WBTR | CLASSICAL | AUSTIN, TX |
| 4 | FM | WMTY 102.5 | COUNTRY | SPARTANBURG, SC |
| 5 | FM | 93.3 THE PLANET | ALTERNATIVE | GREENVILLE, SC |
| 6 | NET | WWCD | POP ROCK | COLUMBUS, OH |
| 7 | NET | WEQX | ALTERNATIVE | MANCHESTER, VT |
| 8 | NET | WBAL | TALK RADIO | BALTIMORE, MD |

FIG. 6H

CD Guide

APRIL 9, 1999 - 7:24 PM     PRESS * TO SEARCH

| | TYPE | TITLE | ARTIST |
|---|---|---|---|
| 1 | CD | ESCAPE | JOURNEY |
| 2 | CD | BIG HEAD TODD ... | OUTWARD BOUND |
| 3 | PL | ELTON JOHN | RANDY'S FAVORITES |
| 4 | MP3 | BILLY JOEL | PIANO MAN |
| 5 | CD | REM | DOCUMENT |
| 6 | PL | SARAH McLACHLAN | MY GREATEST HITS |
| 7 | MP3 | GREEN DAY | DOOKIE |
| 8 | CD | FLEETWOOD MAC | RUMORS |

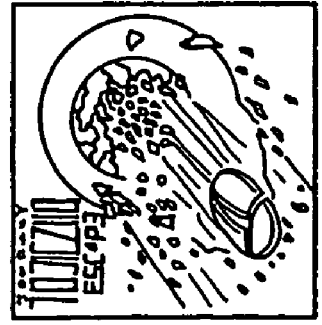

DON'T STOP BELIEVIN'
STONE IN LOVE
WHO'S CRYING NOW
KEEP ON RUNNIN'
STILL THEY RIDE
ESCAPE
LAY IT DOWN
DEAD OR ALIVE
MOTHER, FATHER
OPEN ARMS

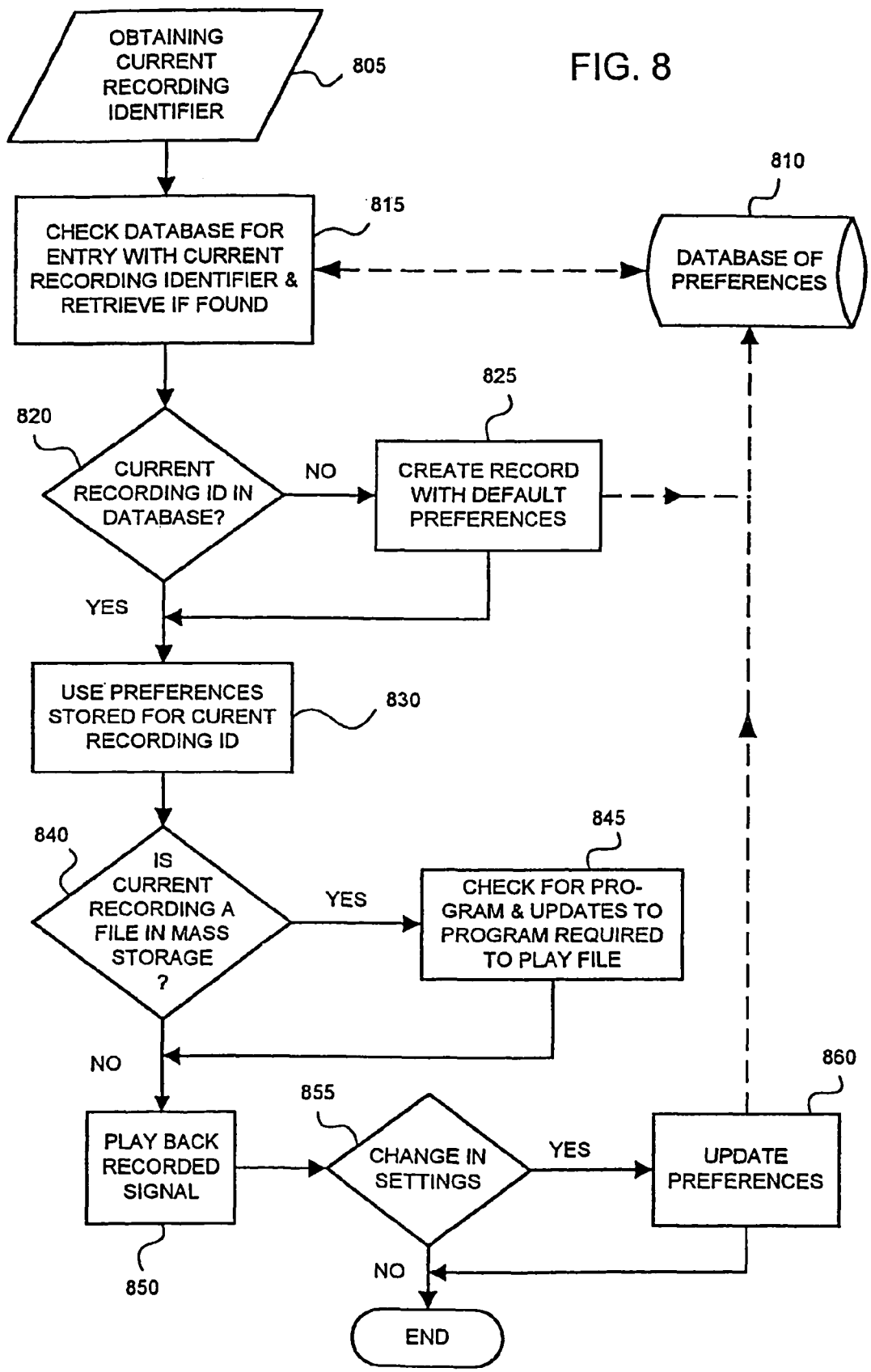

APPARATUS, METHOD AND DATABASE FOR CONTROL OF AUDIO/VIDEO EQUIPMENT

CROSS-REFERENCE TO RELATED APPLICATIONS

This application is related to U.S. patent application Ser. No. 09/002,721, filed Jan. 5, 1998 by Martin R. Wachter, entitled "Automated Control of Electronic Devices;" U.S. patent application Ser. No. 09/060,876, filed Apr. 15, 1998 by Dale Tyson Roberts, et al. "entitled Network Delivery of Interactive Entertainment Complementing Audio Recordings" which is a continuation-in-part of U.S. patent application Ser. No. 08/838,082, filed Apr. 15, 1997 by Dale Tyson Roberts, et al. entitled "Network Delivery of Interactive Entertainment Synchronized to Playback of Audio Recordings," now U.S. Pat. No. 5,987,525; and U.S. patent application Ser. No. 09/227,086 filed Jan. 5, 1999 by Scott A. Jones et al. entitled "Playback Device Having Text Display and Communication with Remote Database of Titles", all incorporated herein by reference.

BACKGROUND OF THE INVENTION

1. Field of the Invention

The present invention is directed to control of audio and video equipment and, more particularly, to use of a computer in a device having the capabilities of an audio/video receiver.

2. Description of the Related Art

Many type of consumer electronics audio/video equipment have been introduced in recent years and more are expected in the near future. There are a number of format for recording or playing back recorded signals, whether they be audio-only or video with audio, such as compact discs (CD), digital versatile discs (DVD), video cassette tapes of several types and audio tapes of several types. Additional formats and devices to play back and sometimes to record audio using the new formats continued to be introduced. In addition, there are numerous formats for recording both audio and video signals in computer mass storage some of which are beginning to approach and sometimes surpass the quality of broadcast signals and recorded formats. There are also numerous types of broadcast signals transmitted from ground-based antennas, satellites, and cable systems. New formats, transmission modes and devices to produce audio and video images therefrom continued to be introduced. However, there have been few advances in the control systems for such devices to simplify the use of such equipment.

Recently, some devices have begun to use on-screen menus and guides to simplify the programming and selection of content. Examples include VCR plus video cassette recorders, and satellite television receivers. Devices such as Tune-Base® provide computer control of CD changers including title, track, and cover art information displayed on a computer monitor and television screen.

More recently, the audio and to a lesser extent video capabilities of personal computers have expanded to include streaming signals received via a network, buffered and reproduced, thereby not requiring large amounts of storage, and compressed formats such as MPEG Layer 3, that can be reproduced with a quality between that of FM broadcasts and compact discs. There are also computer cards that can be added to a personal computer to provide a radio or television tuner, video or output to television monitors and sound and video processing capabilities for digital Dolby® and MPEG-2 video.

There have been several attempts to package devices including such components. Examples include the Philips DVX 8000™ which had audio components outside of the personal computer and the Gateway Destination™ which output computer video in, e.g., VGA format, to a large screen computer monitor. In addition, computer mass storage is used to store video signals not only by conventional computers, but also by devices such as TiVo™ and Replay TV™ which include television programming guides.

Attempts are being made to make consumer electronics more intelligent using JINI™ from Sun® Microsystems and Home Audio Video Interface from Sony®. However, there are no known systems that are effective in providing a powerful and simple control system for audio and video devices.

SUMMARY OF THE INVENTION

It is an object of the present invention to provide an audio/visual receiver with sophisticated computer programming.

It is another object of the present invention to combine playlists of audio recorded on discs and tapes with files in computer mass storage.

It is a further object of the present invention to reproduce audio from multiple forms of recorded signals using playback preferences, including digital signal processing for surround sound effects, for entire discs, individual tracks and files in computer mass storage.

It is yet another object of the present invention to play back recorded signals on digital versatile discs using playback preferences of at least one of audio and video formats saved from a previous use of the digital versatile disc.

It is a still further object of the present invention to provide an audio/video component able to switch audio and video separately and route or mix audio signals, from multiple inputs to multiple outputs.

The above objects can be attained by a method of playing back a recorded signal, including obtaining a recording identifier corresponding to the recorded signal; comparing the recording identifier with previously stored identifiers in a playback preference database; and reproducing the recorded signal using previously stored preferences if the recording identifier is found in the playback preference database and using default preferences if the recording identifier is not found in the playback preference database.

Preferably, the database stores information on at least one of audio and video formats, such as surround sound mode, language of audio in the recorded signal, and video output format when the recorded signal is on a digital versatile disc. The previously stored preferences are obtained during a previous playback of the recorded signal. Preferably, the database also stores playlist records with a playlist identifier for each playlist; an order within the playlist for a recorded signal; a disc identifier when the recorded signal is obtained from a digitally encoded disc; a filename when the recorded signal is obtained from a digitally encoded file on a mass storage device; and the playback preferences for the recorded signal.

The above objects are also be obtained by a method of controlling audio/video equipment, including selecting a first source from among inputs including at least two of a computer file, a computer data connection, a digitally encoded disc player, a radio tuner, a television audio decoder, an MPEG decoder, a S/PDIF input, a microphone, an external video signal and an external audio signal; selecting a first output for the first source from among outputs including a computer mass storage device and at least one of speakers, headphones, an audio tape device, and a video tape device; and routing the first source to the first output. The inputs can also be routed or mixed to others of the available outputs simultaneously by switching and multiplexing circuits. Preferably a graphical user interface is used in performing this method of controlling audio/video equipment.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 2A and 2B form a block diagram of an audio subsystem in the system illustrated in FIG. 1.

FIGS. 6A-6H are display screens of the user interface that controls a system according to the present invention.

FIG. 8 is a flowchart of playback of recorded signals according to the present invention.

DESCRIPTION OF THE PREFERRED EMBODIMENTS

Figure 1:
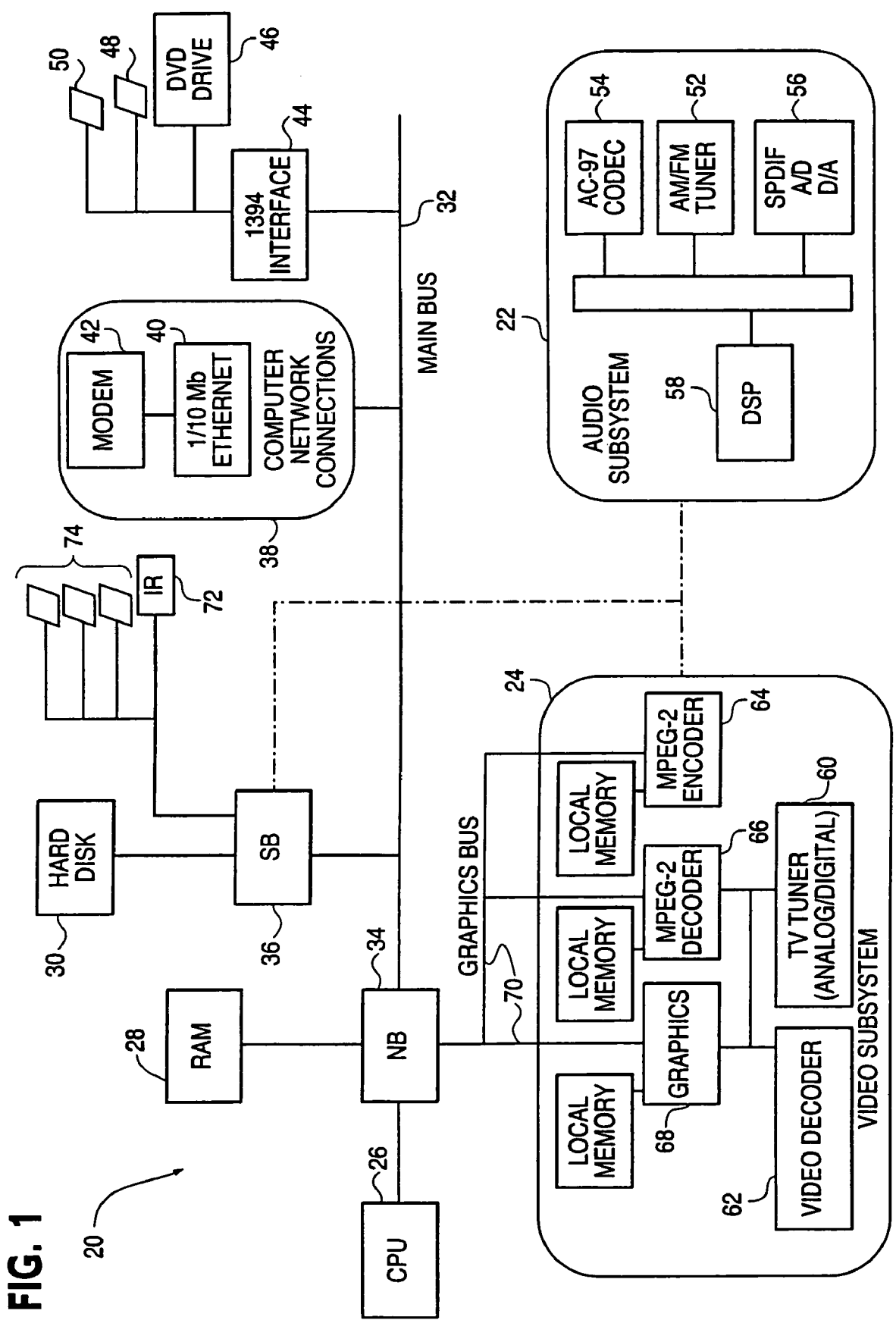
FIG. 1 is a block diagram of a system according to the present invention.

Illustrated in FIG. 1 is a block diagram of a system 20 according to the present invention. The system 20 has an overall construction of a computer with audio 22 and video 24 subsystems. The usual computer components of a CPU 26, RAM 28 and mass storage (hard disk) 30 are connected by main bus 32. In FIG. 1, the common IBM personal computer northbridge 34 and southbridge 36 structures are also illustrated, but the present invention is not limited to this computer architecture. In addition, computer network connections 38 are provided, such as a local area network connection 40 and modem 42. A high speed device interface 44, such as IEEE-1394, is also connected to main bus 32, to provide a connection to components such as removable disc drive 46 for reading digital versatile discs, compact discs, etc., and additional external devices at ports 48, 50.

In FIG. 1 some of the major components of the audio subsystem 22 are illustrated, with additional details provided in FIG. 2. The components illustrated in FIG. 1 include AM/FM tuner 52 and a programmable analog mixer 54, such as an AC97 codec available for many chip manufacturers; one example is Crystal Semiconductor CS4297A. Also illustrated in FIG. 1 are decoders 56 of several types including Sony-Philips digital interface (S/PDIF), analog/digital converters and digital/analog converters, as described in more detail below. Digital signal processor 58 performs processing of audio signals, e.g., to provide surround sound effects such as hall, stadium, club, church, etc. Also supported are Digital Dolby, DTS and variable echo, reverberation, loudness, speed and direction. An example of a DSP chip that can be used is a Crystal Semiconductor CS 4296

In video subsystem 24, television tuner 60 may be provided by a Philips Semiconductor module F1236 MK2-PH or similar device. Video decoder 62 may be provided by components such as one or more Video Matrix TEA6425 chips for decoding S-video inputs and a peripheral device coupled to main bus 32, such as an ATI Rage® Theater™ graphics chip or similar graphics component. Encoder 64 and decoder 66 for Motion Picture Experts Group (MPEG-2 or ISO 13818) compressed digital video, and graphics module 68 may be provided by, e.g., an ATI Rage® 128 AGP card coupled to graphics bus 70.

Southbridge 36 provides connection to other peripheral devices through the universal serial bus (USB) ports to devices, such as an infrared output 72, e.g., a JDS IR-XP$^2$, for controlling devices connected to apparatus 20. Other ports 74 are provided for devices having other control inputs, such as RS-232, Sony's S-link, etc. Additional conventional television components such as a comb filter (e.g., a Philips TDA9183T or similar chip for S-video components) may be included in video subsystem 24.

Figure 2B:
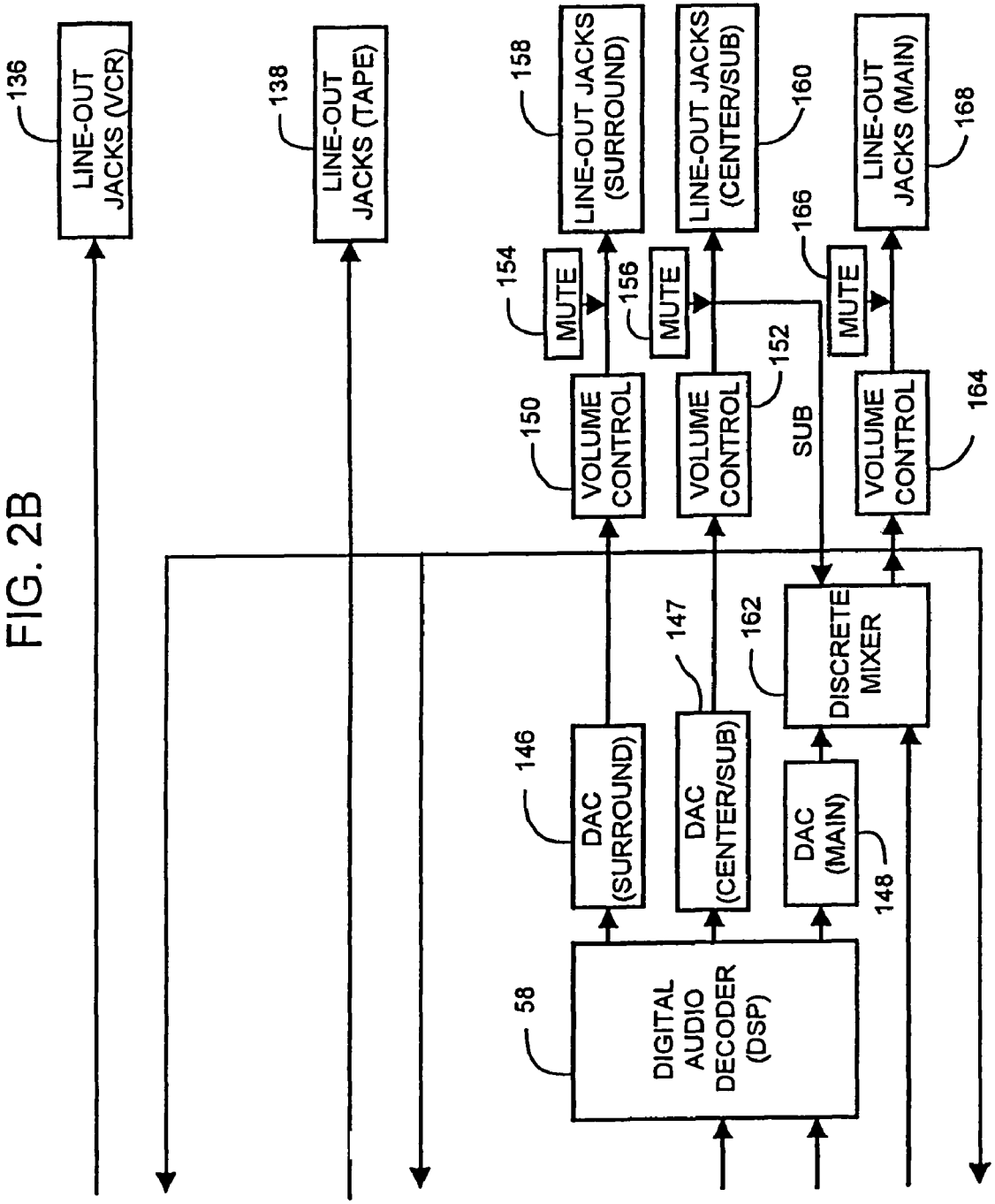

A block diagram of the audio subsystem is illustrated in FIGS. 2A and 2B which should be combined with FIG. 2A on the left and FIG. 2B on the right. The inputs on the left include AM/FM tuner 52 and AC97 codec 54 illustrated in FIG. 1. Other input devices include television audio decoder 100 which may be Philips TDA 9850 and MPEG-2 decoder 102, such as an IBM CD1M or Sigma Designs EM8220. Each of the input components 52, 54, 100 and 102 have one or more inputs not shown in FIG. 2A.

The input jacks illustrated in FIG. 2A include front line-in jack (video 3) 104. rear line-in jacks 106, 108 for video 1 and video 2, respectively, rear line-in audio jacks 110, 112 for, e.g., a CD changer and a tape deck, microphone jack 114 and S/PDIF input 116. Inputs for additional audio and video devices may also be included. In addition, one or more internal connections 120 may be provided for, e.g., CD audio headers and other audio from removable media drive 46 (FIG. 1). For example, not illustrated in FIG. 2A are connections to the inputs of AC97 codec 54 and MPEG-2 decoder 102 to receive pulse code modulated (PCM) output from software that decodes digitally encoded audio files like MP3 files. Either AC97 codec 54 or MPEG-2 decoder 102 could be used as the input for PCM audio, but MPEG-2 decoder 102 is preferred so that the signal is converted to analog only once.

Some of the inputs, such as microphone jack 114 and S/PDIF input 116 are connected to processing components, i.e., microphone pre-amplifier 122 and digital audio receiver 124, respectively. Digital audio receiver 124 may be a Crystal Semiconductor CS8414 which changes the S/PDIF input signal (whether received from an optical interface or a coaxial connector) containing, e.g., AC3, DTS or PCM digital audio into digital signals matching the clock signal and voltage levels used by audio subsystem 22.

AC97 codec 54 receives analog inputs from, e.g., rear line-in jacks 106, 108, internal audio line 120, and microphone pre-amplifier 122. In addition, the main output (described below) may be fed back to AC97 codec 54 which performs analog mixing from the various inputs it receives. The output of AC97 codec 54 is supplied to three multiplexers, VCR line output multiplexer 130 also receivers inputs from front and rear line-in jacks for video 104, 106 and 108; tape line output audio multiplexer 132 also receives input from AM/FM tuner 52, television audio decoder 100, video line-in jacks 104, 106, 108, audio line-in jacks 110, 112, and internal line 120; and main input audio multiplexer 134 receives the same input as tape line output multiplexer 132. VCR and tape line output audio multiplexers 130, 132 are directly supplied to rear line-out jacks 136, 138. The output from main input audio multiplexer 134 is supplied to an operational amplifier 140, such as Motorola MC33078 prior to conversion to digital form in analog/digital converter 142, such as Crystal Semiconductor CS5334. The digital inputs 102, 116 require no conversion and are selected or mixed by digital multiplexer 144.

The digital output signals from analog/digital converter 142 and digital multiplexer 144 are supplied to DSP 58 for digital signal processing to provide surround sound effects, etc. Digital/analog converters 146-148 convert the output from DSP 58 to analog audio signals. The rear surround signals and center/subwoofer signals from D/A converters 146, 147 are supplied to volume control circuits 150, 152 and pass through mute controls 154, 156 before being routed to rear line-out jacks 158, 160. The subwoofer signal from volume control 152 is supplied to discrete mixer 162 along with the output from D/A converter 148 and AC97 codec 54. The output of discrete mixer 162 is supplied to volume control 164 and passes through mute control 166 prior to being supplied to rear line-out jacks 168. The output of discrete mixer 162 is also supplied to AC97 codec 54 and audio multiplexers 130 and 132 for VCR and tape line outputs.

Additional multiplexers could be added to provide additional outputs, just as noted above, additional inputs could be provided. In the illustrated embodiment, the audio subsystem provides up to four independent outputs that can be selected from, or mixtures of, up to 12 input sources. This permits the audio to be selected from an AM/FM tuner or streaming audio obtained from the Internet via modem 42 or Ethernet connection 40 via AC 97 codec 54, while viewing a related video program, such as a sports event or concert. It also permits mixing of audio signals from e.g., a video camcorder connected to one of the video jacks with music from a CD in removable media drive 46, AM/FM tuner 52, computer files via AC97 codec 54, etc., or with words spoken into a microphone connected to microphone jack 114. In addition, it is possible to perform multiple tasks simultaneously, such as recording any input signal, while at the same time copying a video tape, and watching and listening to a DVD or television broadcast.

Figure 3A:
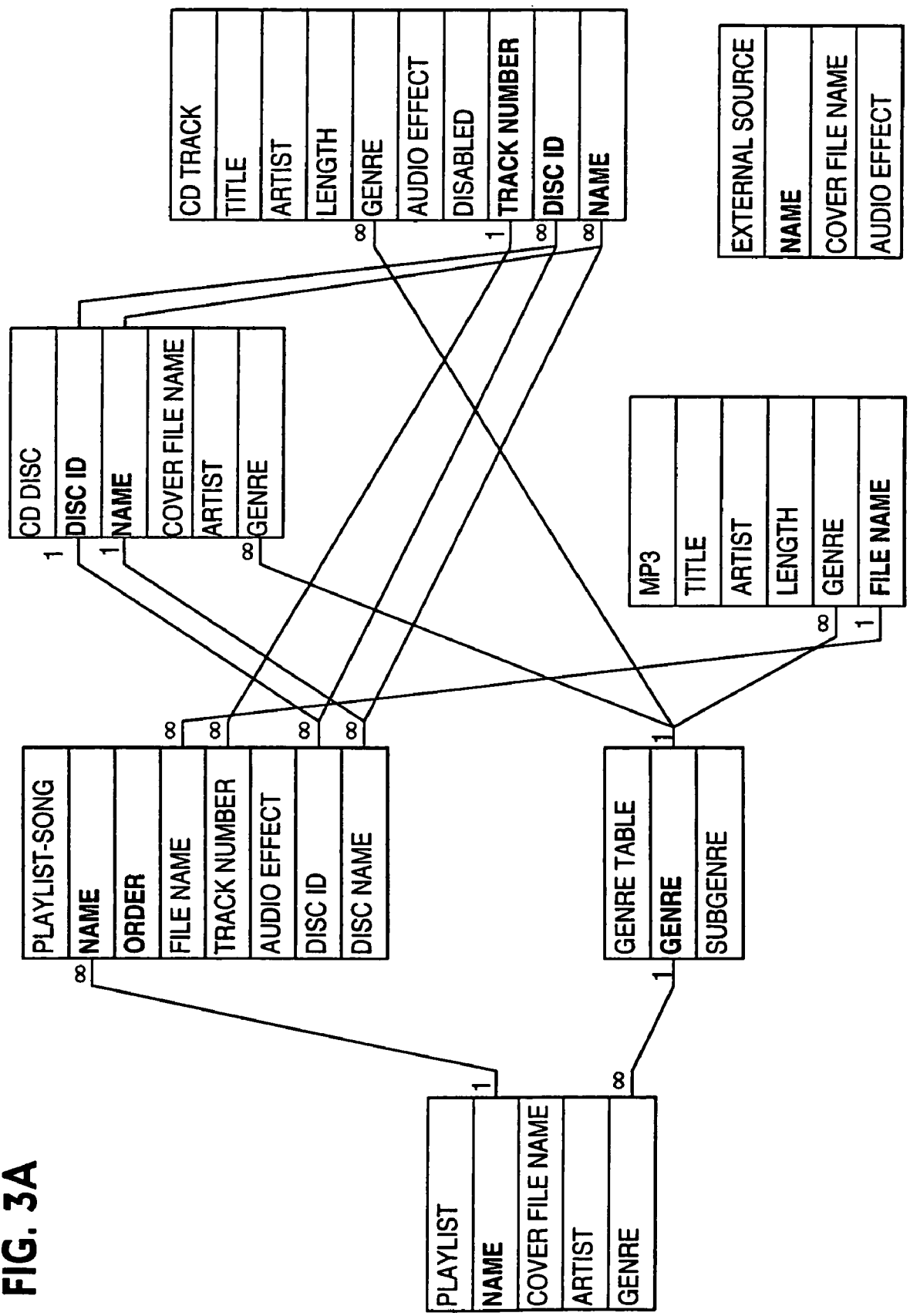
FIGS. 3A and 3B are database record structure diagrams.
Figure 3B:
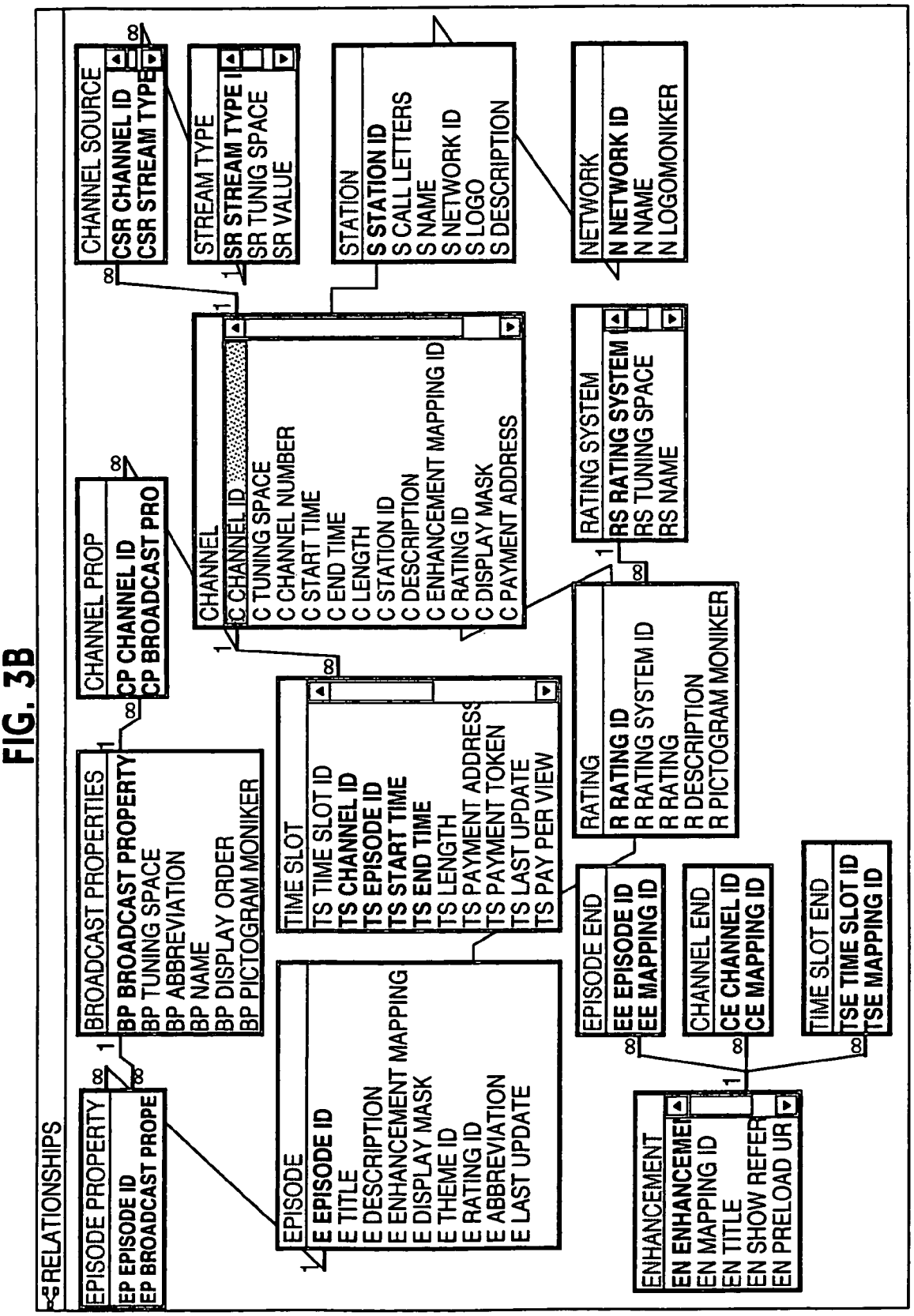

Control of audio subsystem 22 and video subsystem 24 is provided by a program executing in CPU 26. The control functions performed by the CPU 26 includes selection and mixing of audio signals. To support these control functions, databases are stored in mass storage 30. The structure of databases for recorded audio and television are illustrated in FIGS. 3A and 3B, respectively, as examples of the databases maintained by system 20. Additional databases are provided for other types of content, such as broadcast and Internet radio, DVDs, etc.

As illustrated in FIG. 3A, one of the databases contains playlists of recorded audio. Each record in the playlist database may include a name assigned to the playlist, a cover filename for a file used to produce an image associated with the playlist, an artist field identifying the content producer and a genre field identifying the type of content. Another table in the database is named playlist-song which is indexed by playlist name and order within the playlist. Other fields in the playlist-song table are filename which identifies a file stored in mass storage device 30 containing digitally encoded audio, and disc ID or disc name which are used to identify a disc in a disc changer connected to system 20. Either or both of the disc ID and disc name may be used to identify the disc and a track number may be identified to select one of the tracks on the disc. Audio effects may be specified, such as echo, reverberation, loudness, speed and direction for control of DSP 58 and volume control circuits 150, 152, 164. The filename is not provided if the audio recording is obtained from a disc and similarly the disc ID, disc name and track number fields are not used if the filename is provided.

Additional tables are provided for all audio discs that have been played by the system or inserted into the changer(s) connected to system 20 with the same fields as provided for each playlist, plus the disc ID. The information about each track on the disc is maintained in a separate table with the same fields, except cover filename and the additional field length and title. A disabled flag may be included to skip specific tracks. A similar table may be maintained for all of the files stored in mass storage 30, and a table is maintained for genre and subgenre as illustrated in FIG. 3A.

Also illustrated in FIG. 3A is a table for recordings from external sources which require manual intervention to provide the identified recording. Any single-play device would fall into this category, such as a tape deck, mini disc deck, etc. Portable devices whether using tape, disc, solid state or other memory storage would also fall into this category.

At the present time, techniques have been developed for identifying compact discs when an industry standard identifiers is not provided. Databases are accessible via the Internet to provide information, such as title, artists and genre and to provide access to associated images that can be displayed by system 20. However, at the present time, the recordings listed in the external source table would require manual selection of the entry together with manual operations to provide the recording for playback.

Although the table discussed above as identifying files stored in mass storage 30 is illustrated in the FIG. 3A as having the name MP3, any audio file may be included in the table or separate tables may be used for different file formats. The software executed by CPU 26 can be used to manually or automatically download programs to playback the files. The filename extension, for example, may be used by the operating system to identify the program to be used for playback.

In addition, new formats are being developed for audio discs, such as super CD, DVD audio, etc. These or any other subsequently developed formats that require or permit additional processing or effects may be handled by a separate table or additional records or fields for appropriate control of DSP 58.

A separate database (not shown) is preferably maintained for DVDs, including disc ID, title, video output format and surround sound mode. Additional fields, such as angles, language, etc. may be included depending upon what selections can be made during playback on the discs that are played. When a DVD containing video and audio content is, e.g., inserted into removable media drive 46, an entry in the table is generated by the software executing in CPU 26. Associated content, such as cover art, may be automatically downloaded from the Internet. As the user goes through the menu selection to setup playback of the DVD, the selections are recorded in the database. As a result, the next time the same DVD is inserted or selected for playback, play can begin immediately using the previously selected formats and modes.

A database is illustrated in FIG. 3B for broadcast television programs. System 20 is designed to be used with television signals received from land-based antennas, satellites and cable systems. Information on source of program, rating, beginning and ending time or length, payment information for pay-per-view, etc. may all be stored in the database. Storing such information enables guides like those described below to be displayed.

Figure 4:
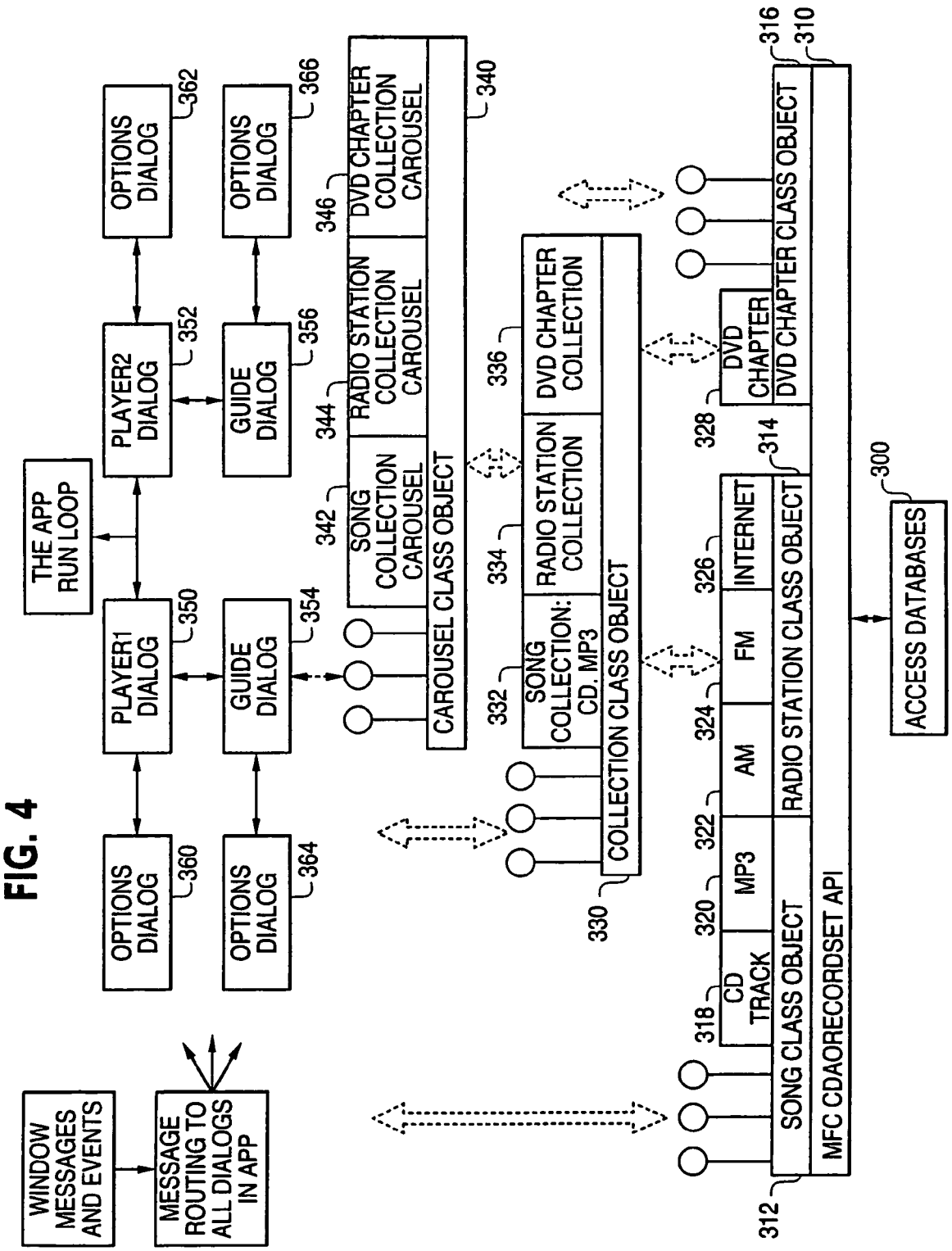
FIG. 4 is a data class object interface diagram.

FIG. 4 shows the data class object interface of software executing in CPU 26 to access the databases like those illustrated in FIGS. 3A and 3B. The databases maintained by system 20 may be implemented using Microsoft Access as indicated by databases 300 in FIG. 4. MFC API 310 is used to access the databases 300. Separate class objects 312, 314, 316 call the MFC API 310. The song class object has at least two types, CD track 318 and mass storage file (MP3) 320. There are three radio station classes AM 322, FM 324 and Internet 326. There is only a single DVD chapter class 328. However, there may be other class objects such as video files and external source recordings. Collection class object 330 is used to store user-selected collections of songs 332, radio stations 334, and television stations (not shown). DVD chapters 336 on a DVD are also maintained as a collection. Carousel class object 340 is used to store all recorded audio in song collection carousel 342; radio stations, whether AM, FM or Internet, in radio station collection carousel 344; and DVD chapters of all discs that have been accessed by system 20 in DVD chapter collection carousel 346.

Figure 5:
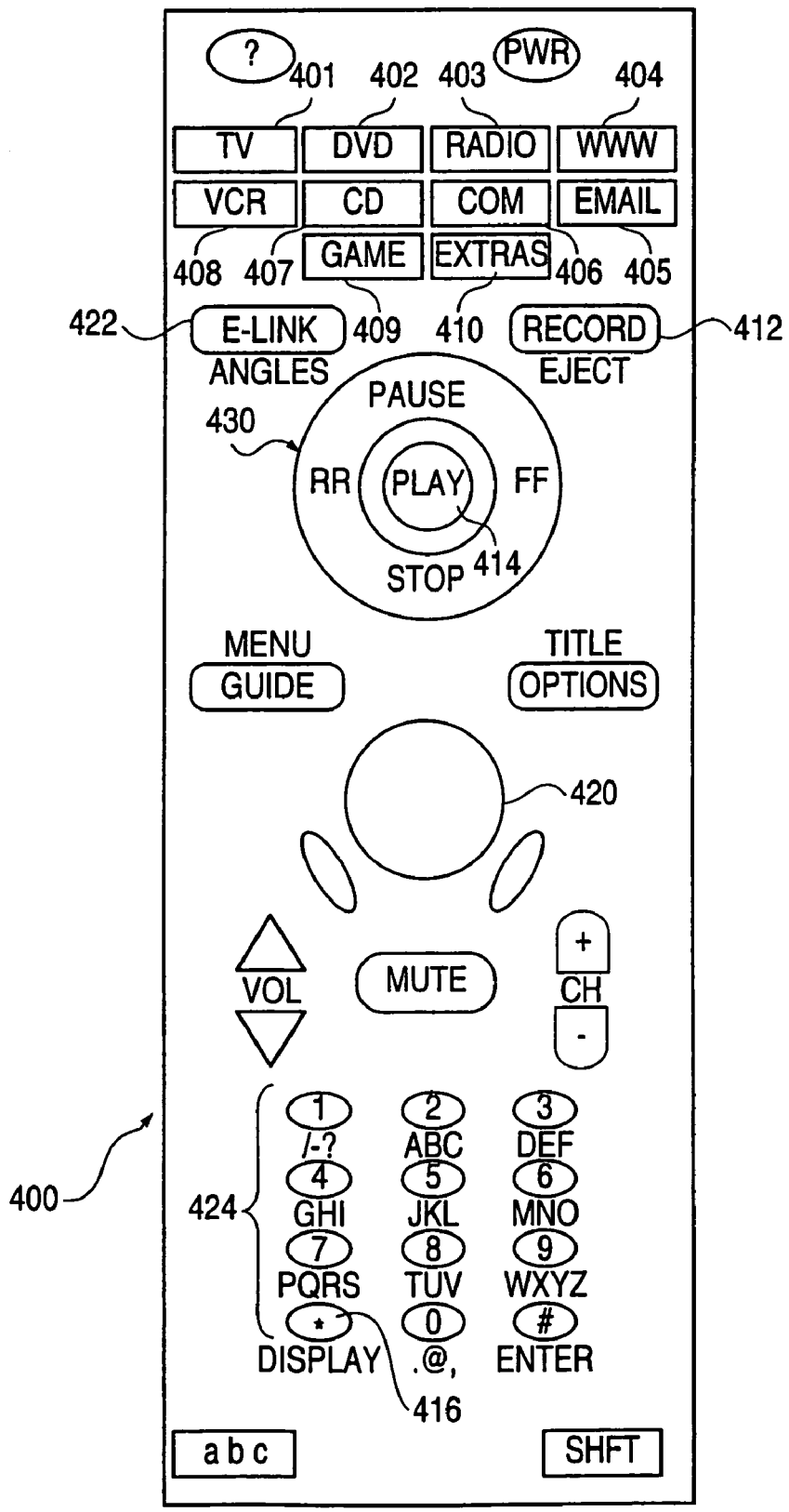
FIG. 5 is a plan view of a remote control for use with a system according to the present invention.

All of the classes may be accessed by dialogs. Illustrated in FIG. 4 are two player dialogs 350, 352 and corresponding guide dialogs 354, 356. Each player dialog corresponds to one of the modes of operation, such as audio player, television, radio, etc. and thus, there are more player dialogs than illustrated in FIG. 4. As indicated in FIG. 4, there are options dialogs 360, 362, 364, 366 corresponding to the player and guide dialogs. These dialogs 350, 352, 354, 356, 360, 362, 364, 366 generate the screen formats described below with reference to the plan view of remote control 400 in FIG. 5 and the display screens in FIGS. 6A-6H.

During installation, system 20 is connected to other components, such as speakers, CD changer(s), a television monitor, a satellite or cable set top device or receiver, video cassette recorder, etc. Infrared remote control codes for the connected components are obtained from an internal database, or a database on a recording medium, or by downloading from the Internet. The Internet connection may be provided by a telephone line connected to modem 42, a local area network via Ethernet connection 40 and external cable modem or satellite connection, etc. Remote control codes available at, e.g., www.ueic.com may be downloaded on an as needed basis by system 20, or may be distributed on computer-readable media, such as a CD-ROM, or otherwise supplied when component(s) are connected to system 20. The connected devices can then be controlled using IR output device 72 as described in the related application Ser. No. 09/002,721.

Preferably, remote control 400 is used to control system 20. Remote control 400 may be an infrared remote or a radio frequency remote and may have a minimal number of buttons as described in related application Ser. No. 09/002,721 or have buttons in a layout like that illustrated in FIG. 5. In either case, user selections of positions on the screen or buttons on remote control 400 are translated by software executing in CPU 26 to generate the required internal operations or external operations communicated by infrared remote control commands or electrical connections to the component being controlled.

When the system 20 is turned on or powered up from stand-by mode, the initial screen display may be the control screen for the last controlled component. when system 20 is first turned on, system 20 is set up to operate all of the components connected thereto and system 20 is left in a control mode for one of the components, such as a television. The second time that system 20 is turned on the same control screen, e.g., a television guide like that illustrated in FIG. 6A is displayed. Using the remote illustrated in FIG. 5, it is easy to select another mode from the mode select buttons 401-410.

Figure 6B:
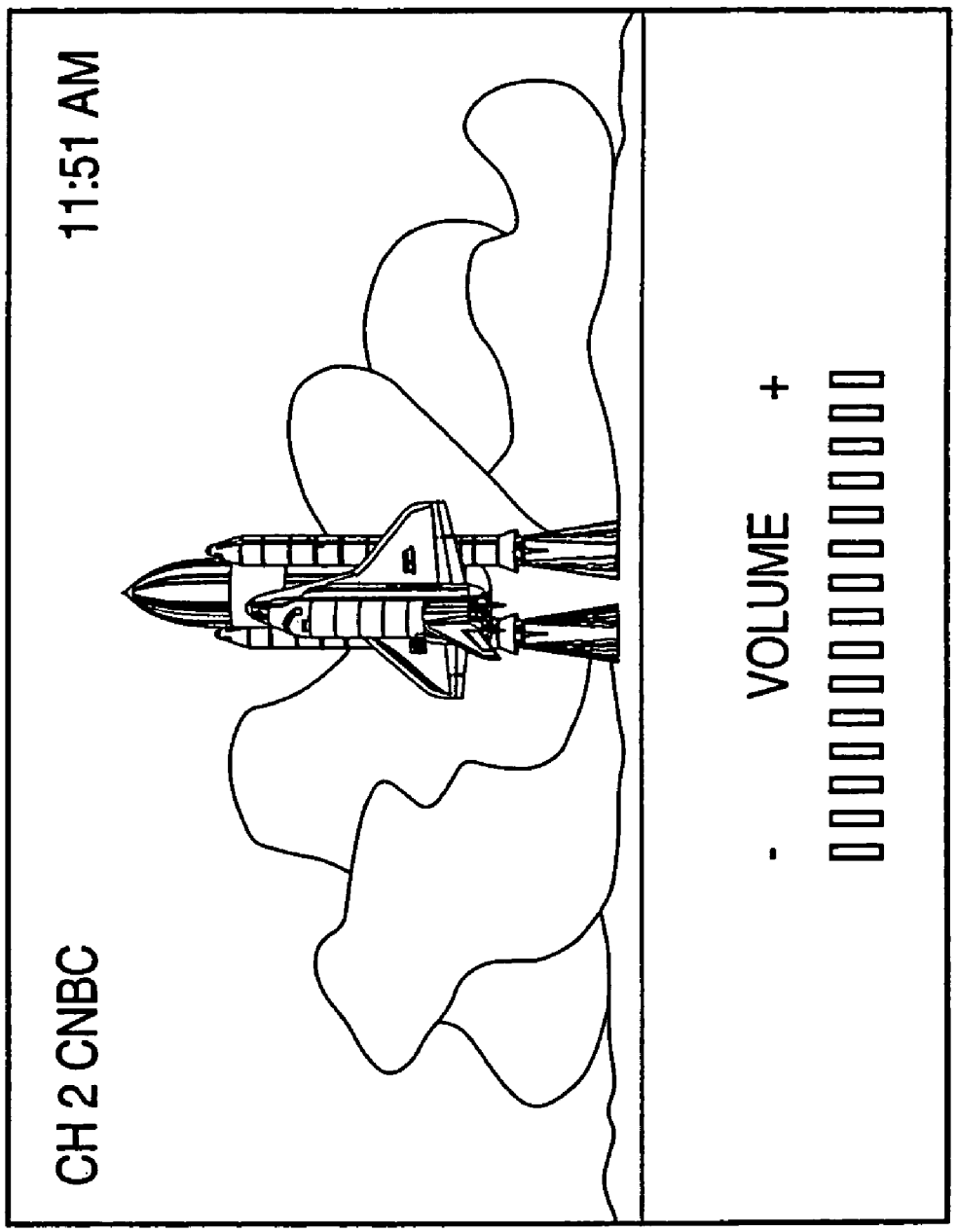
Figure 7:
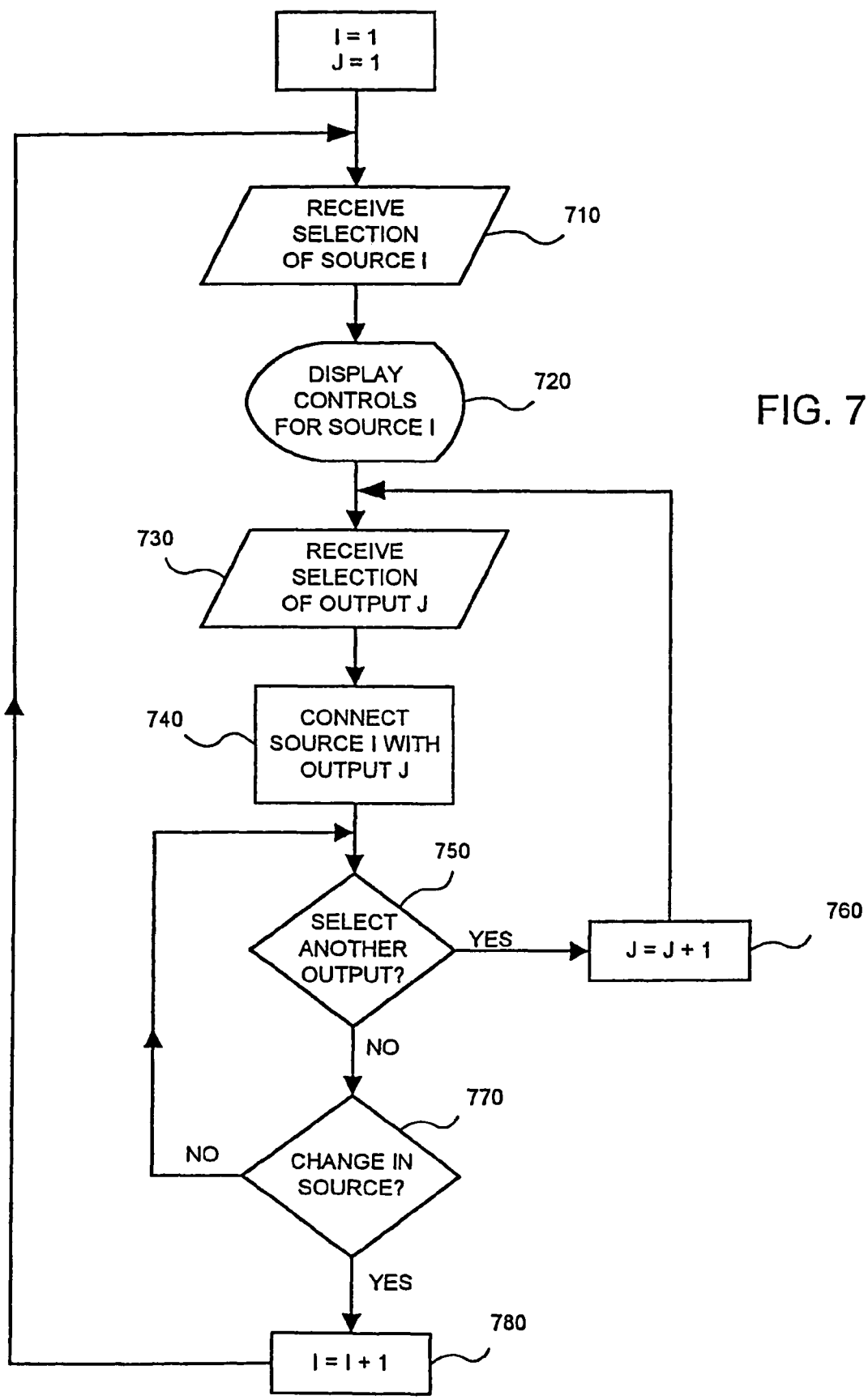
FIG. 7 is a flowchart of operation of a system according to the present invention.

The selection of different modes, i.e., sources of input and output, is depicted in the flowchart illustrated in FIG. 7. An initial source of input is determined 710 from the last controlled component or by pressing one of the mode select buttons 401-410. For example, when television is selected, a TV guide like that illustrated in FIG. 6A may be displayed 720. Just as the last controlled component determined the initial source of input, the last output for that source or a default output, such as speakers, will initially be selected 730 and connected 740 to the initial source. Another output may also be selected 750, 760, 730. An example of an another output is a VCR which may be selected 730 by pressing record button 412 on remote control 400.

After the desired channel has been selected, the user may change from TV guide mode to regular television mode by pressing play button 414 on remote control 400. The screen display changes to a display like that illustrated in FIG. 6B. After a few seconds, the information overlay will disappear and the television signal as received from the selected source will be displayed without conversion. The information overlay illustrated in FIG. 6B can be regenerated for a few seconds by pressing display button 416 on remote control 400. Note that if it is desired to have system 20 work like a conventional television, the initial display can be the television mode illustrated in FIG. 6B, rather than TV guide mode as illustrated in FIG. 6A. The display can be changed to the TV guide mode by pressing guide button 418.

In TV guide mode, the display is generated by CPU 26 with the signal from the selected television channel displayed in a window covering a portion of the screen in a conventional manner, as illustrated in FIG. 6A. The user can interact with the remainder of the display as a conventional graphical user interface having the screen format illustrated in the drawings. For example, an operating system like Windows® NT, 95 or 98, or Apple® Mac® OS 9 to generate the screen displays not illustrated in FIG. 6B, as described in related application Ser. No. 09/060,876. As channels are selected, a description and an associated image may be displayed as illustrated in FIG. 6A. The channels displayed on the TV guide may be all available channels, channels available from a previously selected source, channels in a previously defined group, etc.

The "Activelink" button displayed on the screen in FIG. 6A may be selected using cursor or mouse control 420 or by pressing E-Link button 422 on remote control 400 to access web sites related to the selected program. The initial web site is identified by the enhancement table illustrated in FIG. 3B. Subsequent links are provided from that web site. The enhancement table illustrated in FIG. 3B is preferably automatically updated on a subscription or scheduled basis, or by information received while connected to a selected channel. The enhancement table which is also used in other modes can be updated differently in different modes, as described below.

Any of the other sources of input identified on mode select keys 401-410 may be selected instead of or simultaneously with the first source. For example, if television is selected 710 as the first source and a VCR is selected 750, 760, 730 as a second output, simultaneously with output to speakers, connections will be established 740 by main input audio multiplexer 134 and VCR line output audio multiplexer 130 to route the audio to speaker jacks 158, 160, 168 and VCR jacks 136. Similar multiplexers (not shown) in video subsystem 24 route the television signal to video inputs of any conventional television monitor and video cassette recorder or other recording device (not shown).

Once the recording of the television program has been started, the user may select 770, 780, 710 a different mode, such as DVD mode by pressing DVD button 402. This causes display 720 of a DVD guide for all DVDs previously used with system 20, like that illustrated in FIG. 6C. In addition, pressing another mode button may cause an immediate selection 730 and connection 740 of the default output, e.g., speakers to the new source of input.

Figure 6D:

If a DVD is placed into the system, or one of the entries in the DVD guide is selected and a DVD changer is connected, a screen like that illustrated in FIG. 6D is initially displayed. The same screen display is generated when display button 414 is pressed. As described above, the video output format (e.g., standard 4:3 or one of the letterbox formats), surround sound mode, language, rating, viewing angles, etc. are read from the database and used to control the DVD player to begin playing the disc without requiring setting by the user each time.

Figure 6E:
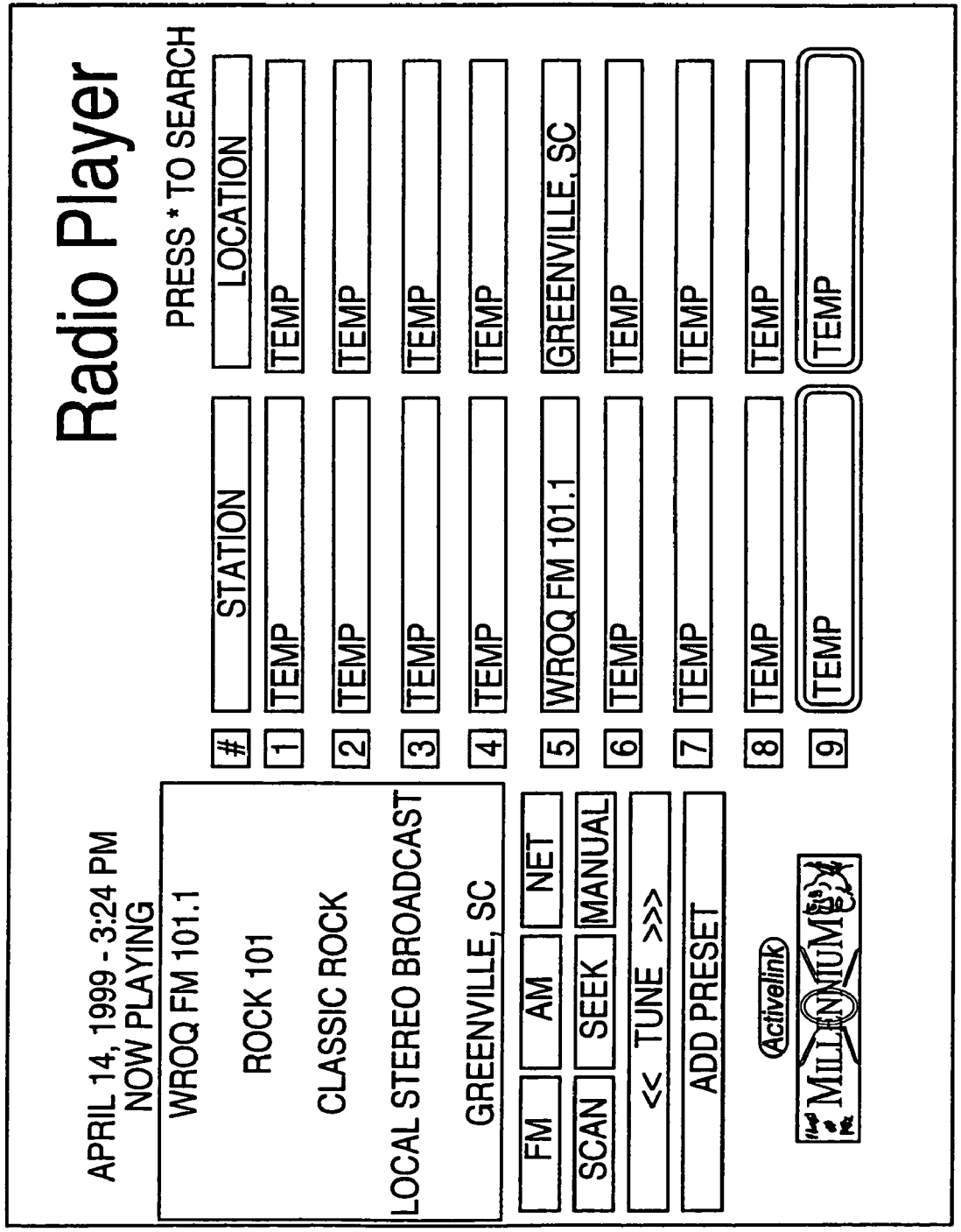

When radio button 403 is selected, a display screen like that illustrated in FIG. 6E may be displayed for the station listened to last time in radio mode. Information about the selected station is provided in a text box based on one of the databases 300 (FIG. 4). Other stations may be selected using the buttons below the text box and added to presets displayed on the right. Selection of the "Activelink" button displayed on the screen or E-Link button 422 on the remote provides access to the web site maintained the selected radio station, or another related web site, such as a web site related to a currently playing a song or commercial, where that information is available in the information stream or a database.

When guide button 418 is selected in radio mode, a radio guide like that illustrated in FIG. 6F may be displayed. Previously defined collections or favorites are indicated near the top of the screen and available stations from broadcast bands and the Internet are displayed. The display may be ordered by number as illustrated in FIG. 6D, or any of the other columns by selecting the column heading. Direct access is available by pressing number(s) on the keypad 424 or the cursor or mouse controls 420.

Figure 6G:
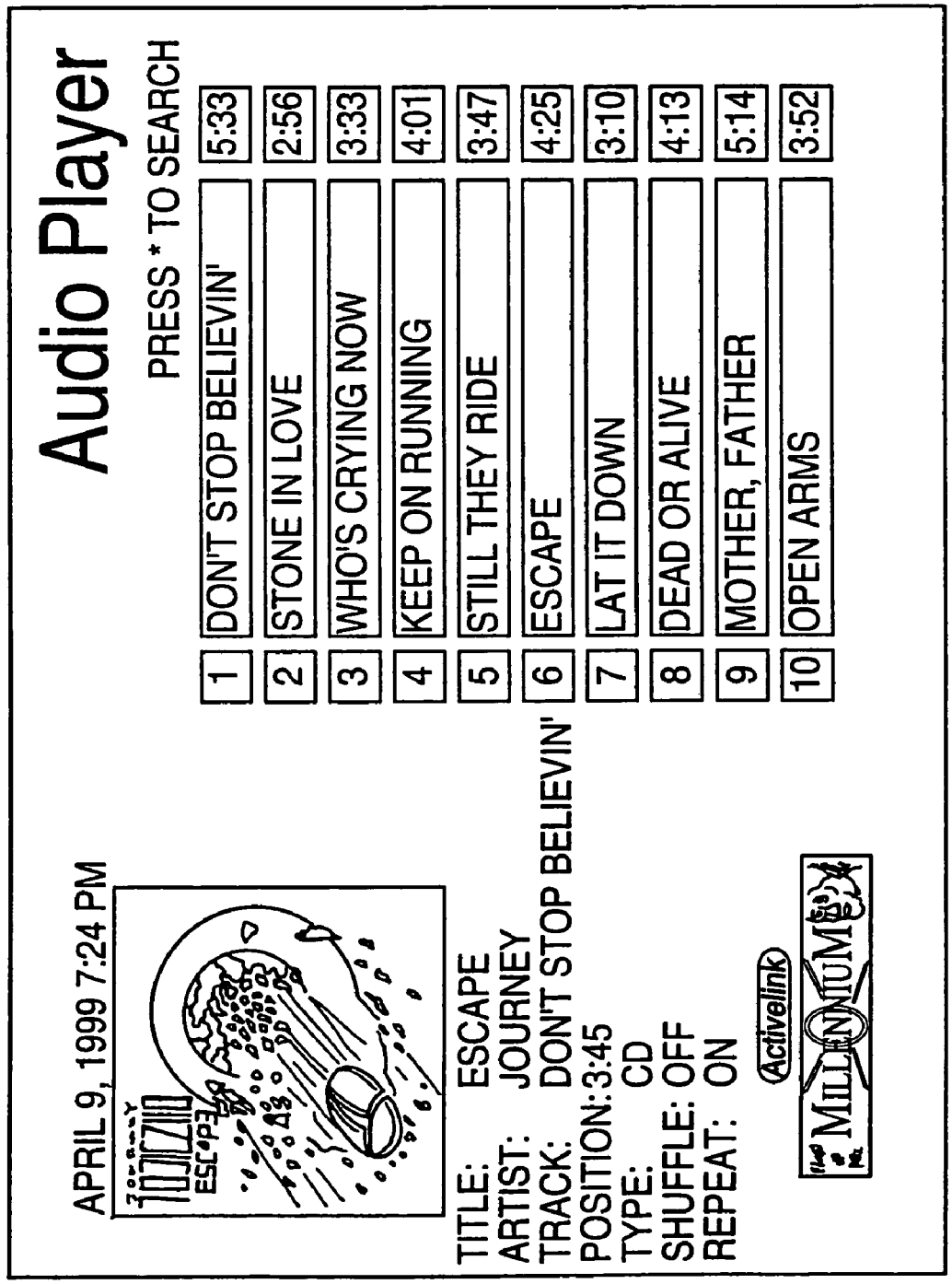

When CD button 407 is selected, a display like that illustrated in FIG. 6G is generated for a currently selected compact disc (CD). As illustrated in FIG. 8, a recording identifier is obtained 805 as described in related application Ser. Nos. 09/060,876 and 09/227,086. Database 810 is accessed 815 and if the current recording identifier is not found 820, a remote database may be accessed and a record created 825 in database 810 for the current recording identifier. The newly created or previously stored preferences in database 810 are used 830 as the compact disc begins to play. Play button 414 and other playback control buttons 430 are used to control playback of the CD.

Compact discs are not the only source of recorded audio that can be played back by system 20. When guide button 418 is selected in audio player mode, a recorded audio guide like that illustrated in FIG. 6H is displayed from the playlist database illustrated in FIG. 3A. If a playlist is selected that includes 840 one or more digitally encoded audio files stored in mass storage 30, system 20 will check 845 that a program is stored that can play back 850 the file like a CD using audio preferences, such as surround sound effects. System 20 will also automatically update 850 the program used to play back files on a subscription or as used basis.

Initially, each CD has an entry in the playlist database with the tracks in the order on the CD with default preferences. If there is a change 855 in the audio control settings during playback, the preferences in database 810 are updated 860. The order of play in the playlist database can be rearranged with tracks deleted from play, or a new playlist can be generated with tracks copied from the initial playlist for the CD. Other playlist can be generated, with names like those illustrated in FIG. 6G with type PL. A playlist may have a combination of CD tracks and files stored in mass storage 30. As noted above, not only MP3 files, but also other formats that digitally encoded audio recordings may be selected for playback in the recorded audio guide.

As discussed above with respect to TV mode, record button 412 may be pressed in TV, radio and CD modes to start recording of the current selection. A default device may be assigned to each source and the user may select a different output. For example, in TV mode, when record button 412 is pressed, a portion of the screen can be used to display a prompt like "press Record again to begin recording on VCR 1, or press Options to select a different device." A similar screen for initially recording to an audio tape deck may be displayed when in the radio mode. The default might be creation of an MP3 file or a CD or mini disc, when in CD mode. The list of devices displayed as available for recording are determined by a database (not shown) of components connected to system 20. Further options may be displayed to postpone recording until additional sources are selected, so that input sources may be mixed. Also, sources may be added to a recording currently under way for, e.g., voice-over on a video or audio recording, supplied by a microphone connected to microphone jack 114.

After recording has been selected for one mode, such as a CD to a CD recorder or a mini disc deck, another mode may be selected while the recording process continues to, e.g., select one VCR for input and another VCR for output. Then, another mode, such as TV, radio, Internet browsing (button 404) or e-mail (button 405) may be selected. In the latter modes, a standard computer keyboard (not shown) may be used to communicate with system 20 by cable, infrared, or radio frequency. If a third device, such as another VCR or a digital television recorder is available, while the CD and video are copied, a broadcast signal from TV or radio may also be recorded. This may include the recording of the video signal from a broadcast television program and the audio from a broadcast or Internet station of the same event onto a video cassette recorder.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of playing back a recorded signal, comprising:
obtaining a recording identifier corresponding to the recorded signal; comparing
the recording identifier with previously stored identifiers in a playback preference database; and
reproducing the recorded signal using previously stored preferences if the recording identifier is found in the playback preference database and using default preferences if the recording identifier is not found in the playback preference database.

2. A method as recited in claim 1, further comprising:
obtaining playback preferences during said reproducing; and
storing the playback preferences in the playback preference database.

3. A method as recited in claim 2, wherein the playback preferences include audio control settings.

4. A method as recited in claim 3, wherein the audio control settings include programmable effects.

5. A method as recited in claim 4, further comprising obtaining the recorded signal from a compact disc.

6. A method as recited in claim 4, further comprising obtaining the recorded signal from a file of digitally encoded audio on a computer readable medium.

7. A method as recited in claim 6, wherein the file is digitally encoded using ISO-MPEG Audio Layer-3.

8. A method as recited in claim 6,
wherein the computer readable medium is a computer mass storage device, and wherein said method further comprises:
detecting changes in software available to playback the recorded signal, and
automatically downloading the software to playback the recorded signal.

9. A method as recited in claim 4, wherein the programmable effects are surround sound effects.

10. A method as recited in claim 3, wherein the audio control settings include at least one of echo, reverberation, loudness, speed and direction.

11. A method as recited in claim 2, further comprising obtaining the recorded signal from a digital versatile disc.

12. A method as recited in claim 11, wherein the playback preferences include at least one of audio and video control settings.

13. A method as recited in claim 12, wherein the playback preferences include surround sound mode.

14. A method as recited in claim 12, wherein the playback preferences include language of audio in the recorded signal.

15. A method as recited in claim 12, wherein the playback preferences include content rating.

16. A method as recited in claim 12, wherein the playback preferences include at least one viewing angle.

17. A method as recited in claim 12, wherein the playback preferences include video output mode.

18. A method as recited in claim 11,
wherein the default preferences include at least one of surround sound mode, language of audio in the recorded signal, and video output format, and
wherein as many of the default preferences are used as available on the digital versatile disc if the recording identifier is not found in the playback preference database.

19. A non-transitory computer-readable mass storage device comprising at least one computer program for playing back a recorded signal, wherein execution of the at least one computer program carries out functions comprising:
obtaining a recording identifier corresponding to the recorded signal;
comparing the recording identifier with previously stored identifiers in a playback preference database; and
reproducing the recorded signal using previously stored preferences if the recording identifier is found in the playback preference database and using default preferences if the recording identifier is not found in the playback preference database.

20. The non-transitory computer-readable mass storage device as recited in claim 19, wherein execution of the at least one computer program further carries out functions comprising:
obtaining playback preferences during said reproducing; and
storing the playback preferences in the playback preference database.

21. The non-transitory computer-readable mass storage device as recited in claim 20, wherein the playback preferences include audio control settings.

22. The non-transitory computer-readable mass storage device as recited in claim 21, wherein the audio control settings include programmable effects.

23. The non-transitory computer-readable mass storage device as recited in claim 22, wherein execution of the at least one computer program carries out obtaining the recorded signal from a compact disc.

24. The non-transitory computer-readable mass storage device as recited in claim 22, wherein execution of the at least one computer program carries out obtaining the recorded signal from a file of digitally encoded audio on a computer readable medium.

25. The non-transitory computer-readable mass storage device as recited in claim 24, wherein the file is digitally encoded using ISO-MPEG Audio Layer-3.

26. The non-transitory computer-readable mass storage device as recited in claim 24,
wherein the computer readable medium is another non-transitory computer-readable mass storage device, and
wherein execution of the at least one computer program further carries out functions comprising:
detecting changes in software available to playback the recorded signal, and
automatically downloading the software to playback the recorded signal.

27. The non-transitory computer-readable mass storage device as recited in claim 22, wherein the programmable effects are surround sound effects.

28. The non-transitory computer-readable mass storage device as recited in claim 21, wherein the audio control settings include at least one of echo, reverberation, loudness, speed and direction.

29. The non-transitory computer-readable mass storage device as recited in claim 20, wherein execution of the at least one computer program carries out obtaining the recorded signal from a digital versatile disc.

30. The non-transitory computer-readable mass storage device as recited in claim 29, wherein the playback preferences include at least one of audio and video control settings.

31. The non-transitory computer-readable mass storage device as recited in claim 30, wherein the playback preferences include surround sound mode.

32. The non-transitory computer-readable mass storage device as recited in claim 30, wherein the playback preferences include language of audio in the recorded signal.

33. The non-transitory computer-readable mass storage device as recited in claim 30, wherein the playback preferences include content rating.

34. The non-transitory computer-readable mass storage device as recited in claim 30, wherein the playback preferences include at least one viewing angle.

35. The non-transitory computer-readable mass storage device as recited in claim 30, wherein the playback preferences include video output mode.

36. The non-transitory computer-readable mass storage device as recited in claim 29,
wherein the default preferences include at least one of surround sound mode, language of audio in the recorded signal, and video output format, and
wherein as many of the default preferences are used as available on the digital versatile disc if the recording identifier is not found in the playback preference database.

* * * * *